J. B. Machamer.

Index for Sharpening Saws.

Nº 88,649. Patented Apr. 6, 1869.

Witnesses  
Ruth R. Abbott  
A. W. Helderbrand

Inventor  
J. B. Machamer  
By Job Abbott, Attorney

J. B. MACHAMER, OF NEW BALTIMORE, OHIO.

Letters Patent No. 88,649, dated April 6, 1869.

IMPROVEMENT IN INDEX FOR FILING CIRCULAR SAWS.

The Schedule referred to in these Letters Patent and making part of the same

*To all whom it may concern:*

Be it known that I, J. B. MACHAMER, of New Baltimore, in the county of Stark, and State of Ohio, have invented a new and improved Index for Circular Saws; and I do hereby declare that the following is a full, clear, and exact description of my invention, reference being had to the accompanying drawings, forming a part of this specification, and to the letters of reference marked thereon, of which drawings—

Figure 1:
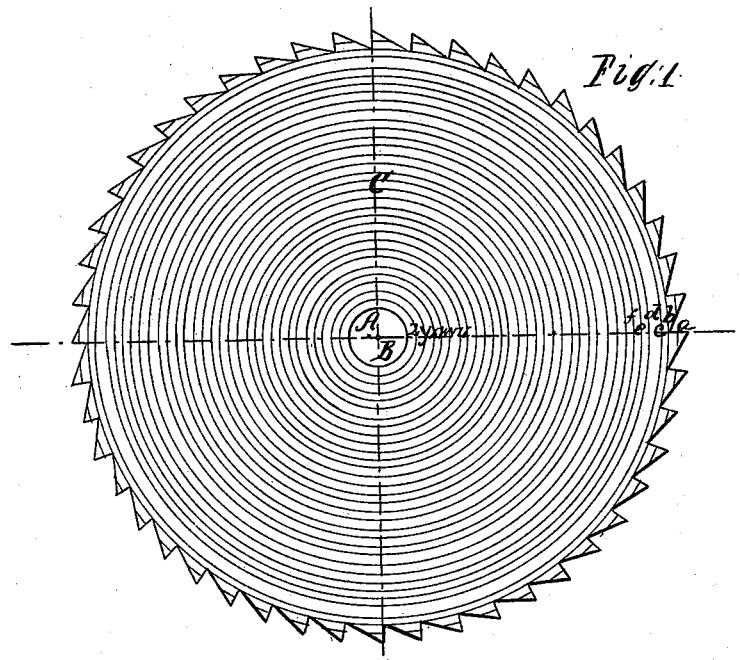
Figure 1 is an elevation of a circular saw provided with my index.
Figure 2:
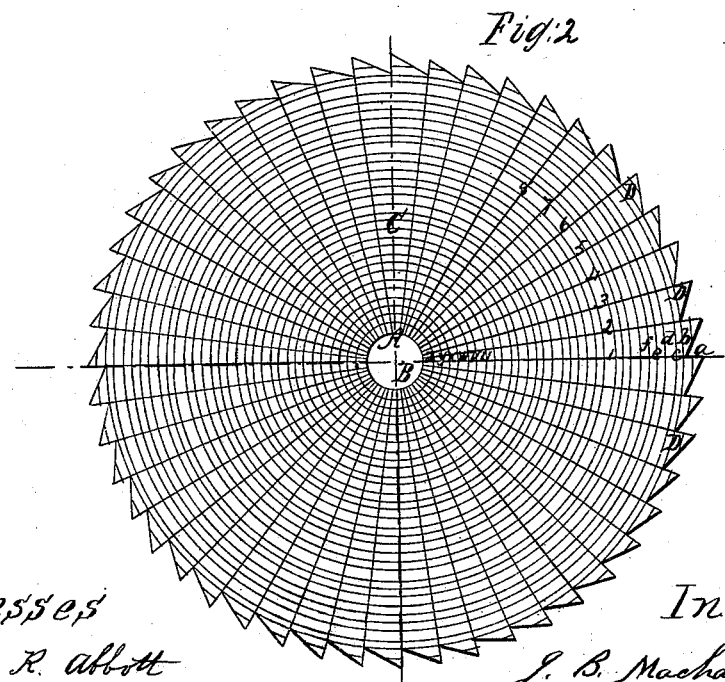
Figure 2 is an elevation of the same with a radial index added.

The nature of my invention consists in cutting, or stamping on a circular saw, (at any time after it has been worked into the proper shape, and is not to receive any further change of form from heating or hammering,) a series of concentric circles, having a common centre at the centre of rotation of the saw, and at suitable intervals from each other, from the eye of the saw to the points of the teeth, whereby I afford to the operator in filing the saw, a perfect index to its shape, and thus enable him at all times to preserve the true circular form of the saw, which is indispensable to the proper working of the same. Said index is also useful in the setting of a saw, on a mandrel, where the mandrel-stem is smaller than the eye of the saw, when the index, in connection with the mandrel-face, affords an easy mode of adjusting the saw to its correct position.

The second part of my invention consists in combining with the circular index of a circular saw, made as just shown, a radial index formed by cutting or stamping on the saw-plate, (at any time after it has been worked into its proper shape, as before stated,) a series of radial lines, as is hereinafter shown, whereby in the filing of the saw, the operator is enabled to preserve not only a circular form to the saw, but also to preserve the equality of the angular distances between the points of the saw-teeth, thus insuring the regular working of the saw.

To enable others skilled in the art to make and use my invention, I will proceed to describe its construction and application.

In the annexed drawings—

C represents an ordinary form of circular saw, provided with teeth D D, and the eye A, as shown, the centre of rotation of saw being supposed to be at B.

The saw being of correct form, it is evident that the ends of each of the teeth D D will be at an equal distance from the centre B.

With B as a centre, I cut or stamp a series of circles $a\ b\ c\ d\ e\ f\ u\ v\ w\ x\ y\ z$. Said circles being placed at suitable intervals from each other, generally from one-fourth to one-eighth of an inch apart, measuring from the end of a tooth, D, towards the centre B.

The whole of these circles are cut below the gullet of the teeth D D, but of course between the bottom of the gullets, and the points of the teeth only a portion of the circles are seen, as will be seen by examining circle $a$.

The operator having to file a saw provided with this index, has only to file the teeth until their points are all the same distance from one of the circles $a\ b\ c$, when it is evident that the proper form of the saw is attained.

This index may be cut on one or both sides of the saw, as found desirable, but where it is cut on both sides, great care should be taken in order that the centres B, on the two sides, shall be exactly opposite each other, and that the corresponding circles $a\ b\ c$, $x\ y\ z$, on the two sides, be of the same diameters.

It is evident that if the saw-mandrel collar, or face, which is of a circular form, be brought up to a saw provided with this index, so that the outer edge of this mandrel-collar shall be at all points equidistant from one of the circles $u\ v\ w$, that the saw will be in its proper position on the mandrel, whether the mandrel-stem fits the eye of the saw or not, which mode of adjusting the saw on the mandrel is often of considerable utility, where the eye of the saw is of a different diameter from that of the mandrel-stem.

In order to insure the equality of the distances between the points of the teeth, I draw either on one or both sides of the saw, as may be found desirable, a series of radial lines, 1 2 3 4 5 6 7 8, from the point of each tooth to the centre B, taking particular care where these lines are used on both sides of the saw, that they come exactly opposite each other, and that when drawn either on one or both sides, that they have the same angular distance between each other.

It is evident that in filing a saw provided with this combined index, the operator has only to so file the teeth, as that each tooth-point shall measure the same distance from the intersection of the nearest radial line and index-circle, to insure the perfect equality in the distances between the points, so essential to the uniform working of the saw.

Having thus fully described my invention,

What I claim as new, and desire to secure by Letters Patent, is—

As a new article of manufacture, a circular saw, provided with a circular index, when said index is constructed and applied to the finished saw-plate, as shown, and whether the radial index be or be not used in combination with said circular index, substantially as is herein specified.

As evidence that I claim the foregoing, I have hereunto set my hand, this 2d day of November, 1868.

J. B. MACHAMER.

Witnesses:
ABNER TAYLOR,
M. I. TAYLOR.